(12) United States Patent
Hashiwaki et al.

(10) Patent No.: US 10,573,866 B2
(45) Date of Patent: Feb. 25, 2020

(54) SEPARATOR AND SECONDARY BATTERY INCLUDING THE SEPARATOR

(71) Applicant: Sumitomo Chemical Company, Limited, Tokyo (JP)

(72) Inventors: Hiroki Hashiwaki, Niihama (JP); Chikara Murakami, Osaka (JP); Junji Suzuki, Niihama (JP)

(73) Assignee: Sumitomo Chemical Company, Limited, Tokyo (JP)

( * ) Notice: Subject to any disclaimer, the term of this patent is extended or adjusted under 35 U.S.C. 154(b) by 0 days.

(21) Appl. No.: 16/344,084

(22) PCT Filed: Oct. 24, 2016

(86) PCT No.: PCT/JP2016/081467
§ 371 (c)(1),
(2) Date: Apr. 23, 2019

(87) PCT Pub. No.: WO2018/078698
PCT Pub. Date: May 3, 2018

(65) Prior Publication Data
US 2019/0245179 A1  Aug. 8, 2019

(51) Int. Cl.
*H01M 2/16* (2006.01)
*C08L 23/06* (2006.01)
*C08J 9/26* (2006.01)

(52) U.S. Cl.
CPC ............ *H01M 2/1653* (2013.01); *C08J 9/26* (2013.01); *C08L 23/06* (2013.01); *H01M 2/16* (2013.01);
(Continued)

(58) Field of Classification Search
None
See application file for complete search history.

(56) References Cited

U.S. PATENT DOCUMENTS

| 2009/0030100 A1 | 1/2009 | Nagamatsu et al. |
| 2015/0228948 A1 | 8/2015 | Maruyama et al. |

(Continued)

FOREIGN PATENT DOCUMENTS

| JP | H10-296839 A | 11/1998 |
| JP | H10-298325 A | 11/1998 |

(Continued)

OTHER PUBLICATIONS

Written Opinion dated Jan. 24, 2017 in Int'l Application No. PCT/JP2016/081467, translation of Written Opinion only.
(Continued)

*Primary Examiner* — Scott J. Chmielecki
(74) *Attorney, Agent, or Firm* — Panitch Schwarze Belisario & Nadel LLP

(57) ABSTRACT

Provided is a separator capable of suppressing an increase in internal resistance and a decrease in a battery performance. A separator having a first layer consisting of a porous polyolefin and an organic antioxidant and a secondary battery including the separator are provided. The first layer has a parameter X, defined by the following equation, equal to or more than 0 and equal to or less than 20, $$X = 100 \frac{|MD\tan\delta - TD\tan\delta|}{\frac{|MD\tan\delta + TD\tan\delta|}{2}}$$

where MD tan δ and TD tan δ are respectively a loss tangent in a flow direction and a loss tangent in a width direction which are obtained by a viscoelasticity measurement of the first layer at a temperature of 90° C. and a frequency of 10 Hz. A white index of the first layer is equal to or more than 85 and equal to or less than 98.

6 Claims, 1 Drawing Sheet

(52) U.S. Cl.
CPC ... *H01M 2/1686* (2013.01); *C08J 2201/0444* (2013.01); *C08J 2323/06* (2013.01); *C08J 2491/06* (2013.01); *C08L 2201/08* (2013.01); *C08L 2203/20* (2013.01); *C08L 2205/025* (2013.01); *C08L 2207/068* (2013.01)

(56) References Cited

U.S. PATENT DOCUMENTS

| | | | |
|---|---|---|---|
| 2015/0236318 | A1 | 8/2015 | Katayama et al. |
| 2017/0040584 | A1 | 2/2017 | Kurakane et al. |
| 2017/0155110 | A1 | 6/2017 | Yashiki |
| 2017/0155113 | A1* | 6/2017 | Hashiwaki .......... H01M 2/1653 |
| 2019/0245180 | A1* | 8/2019 | Okugawa ............ H01M 2/1686 |

FOREIGN PATENT DOCUMENTS

| | | |
|---|---|---|
| JP | H11-060789 A | 3/1999 |
| JP | 2004-303473 A | 10/2004 |
| JP | 2011-233245 A | 11/2011 |
| JP | 2013-073737 A | 4/2013 |
| JP | 2013213212 A | 10/2013 |
| JP | 2014-038771 A | 2/2014 |
| JP | 2014-056843 A | 3/2014 |
| JP | 2014-118515 A | 6/2014 |
| JP | 2014-182875 A | 9/2014 |
| JP | 2015-060686 A | 3/2015 |
| JP | 2015171814 A | 10/2015 |
| JP | 6014743 B1 | 10/2016 |
| JP | 6025957 B1 | 11/2016 |
| KR | 20150048103 A | 5/2015 |

OTHER PUBLICATIONS

Int'l Search Report and Written Opinion dated Jan. 24, 2017 in Int'l Application No. PCT/JP2016/081467 (translation of ISR only).
Office Action dated Sep. 5, 2019 in KR Application No. 1020197013287 (Partial English Translation).

* cited by examiner

SEPARATOR AND SECONDARY BATTERY INCLUDING THE SEPARATOR

CROSS-REFERENCE TO RELATED APPLICATION

This application is a Section 371 of International Application No. PCT/JP2016/081467, filed Oct. 24, 2016, which was published in the Japanese language on May 3, 2018, under International Publication No. WO 2018/078698 A1, the disclosure of which is incorporated herein by reference in its entirety.

FIELD

An embodiment of the present invention relates to a separator and a secondary battery including the separator. For example, an embodiment of the present invention relates to a separator capable of being used in a nonaqueous electrolyte-solution secondary battery and a nonaqueous electrolyte-solution secondary battery including the separator.

BACKGROUND

As a typical example of a nonaqueous electrolyte-solution secondary battery, a lithium ion secondary battery is represented. Since a lithium-ion secondary battery has a high energy density, it has been widely used in electronic devices such as a personal computer, a mobile phone, and a mobile information terminal. A lithium ion secondary battery includes a positive electrode, a negative electrode, an electrolyte solution charged between the positive electrode and the negative electrode, and a separator. The separator separates the positive electrode and the negative electrode from each other and also functions as a film transmitting the electrolyte solution and carrier ions. For example, patent literature 1 to 7 disclose a separator including a polyolefin.

CITATION LIST

Patent Literature

Patent Literature 1: Japanese Patent Application Publication No. H10-298325
Patent Literature 2: Japanese Patent Application Publication No. 2011-233245
Patent Literature 3: Japanese Patent Application Publication No. 2014-118515
Patent Literature 4: Japanese Patent Application Publication No. 2014-182875
Patent Literature 5: Japanese Patent Application Publication No. 2014-56843
Patent Literature 6: Japanese Patent Application Publication No. 2013-73737
Patent Literature 7: Japanese Patent Application Publications No. 2015-60686

SUMMARY

An object of the present invention is to provide a separator capable of being used in a secondary battery such as a nonaqueous electrolyte-solution secondary battery and a secondary battery including the separator.

An embodiment of the present invention is a separator including a first layer which consists of a porous polyolefin. The first layer has a parameter X, defined by the following equation, equal to or more than 0 and equal to or less than 20 and a white index equal to or more than 85 and equal to or less than 98.

$$X = 100 \frac{|MD\tan\delta - TD\tan\delta|}{\frac{|MD\tan\delta + TD\tan\delta|}{2}}$$

Here, MD tan δ and TD tan δ are respectively a loss tangent in a flow direction and a loss tangent in a width direction obtained by a viscoelasticity measurement of the first layer at a temperature of 90° C. and a frequency of 10 Hz.

EFFECTS OF INVENTION

According to the present invention, it is possible to provide a separator which can prevent increase in internal resistance and reduction in battery performance of a secondary battery and a secondary battery including the separator.

DESCRIPTION OF EMBODIMENTS

Hereinafter, the embodiments of the present invention are explained with reference to the drawings and the like. The invention can be implemented in a variety of different modes within its concept and should not be interpreted only within the disclosure of the embodiments exemplified below.

The drawings may be illustrated so that the width, thickness, shape, and the like are illustrated more schematically compared with those of the actual modes in order to provide a clearer explanation. However, they are only an example, and do not limit the interpretation of the invention.

In the specification and the claims, unless specifically stated, when a state is expressed where a structure is arranged "on" another structure, such an expression includes both a case where the substrate is arranged immediately above the "other structure" so as to be in contact with the "other structure" and a case where the structure is arranged over the "other structure" with an additional structure therebetween.

In the specification and the claims, an expression "substantially including only A" or an expression "consisting of A" includes a state where no substance is included other than A, a state where A and an impurity are included, and a state misidentified as a state where a substance other than A is included due to a measurement error. When this expression means the state where A and an impurity are included, there is no limitation to the kind and concentration of the impurity.

<First Embodiment>

Figure 1A:
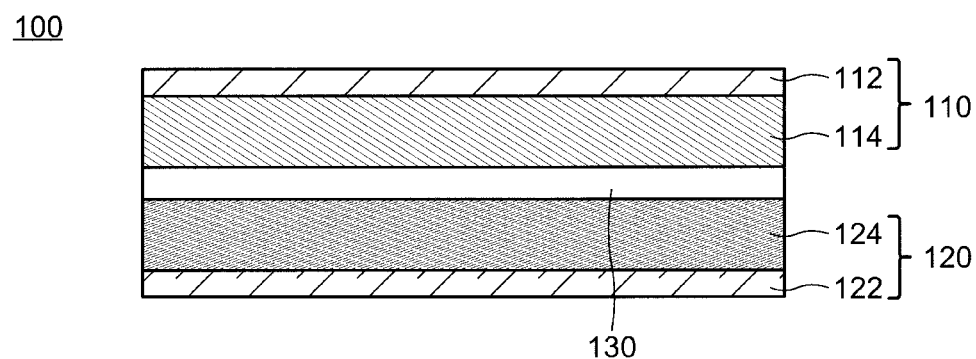
FIGS. 1A and 1B are respectively schematic cross-sectional views of a secondary battery and a separator according to an embodiment of the present invention.

A schematic cross-sectional view of a secondary battery 100 according to an embodiment of the present invention is shown in FIG. 1A. The secondary battery 100 includes a positive electrode 110, a negative electrode 120, and a separator 130 separating the positive electrode 110 and the negative electrode 120 from each other. Although not illustrated, the secondary battery 100 possesses an electrolyte solution 140. The electrolyte solution 140 mainly exists in apertures of the positive electrode 110, the negative electrode 120, and the separator 130 as well as in the gaps between these members. The positive electrode 110 may include a positive-electrode current collector 112 and a positive-electrode active-substance layer 114. Similarly, the negative electrode 120 may include a negative-electrode current collector 122 and a negative-electrode active-substance layer 124. Although not illustrated in FIG. 1A, the secondary battery 100 further possesses a housing by which the positive electrode 110, the negative electrode 120, the separator 130, and the electrolyte solution 140 are supported.

1. Separator 1-1. Structure

Figure 1B:
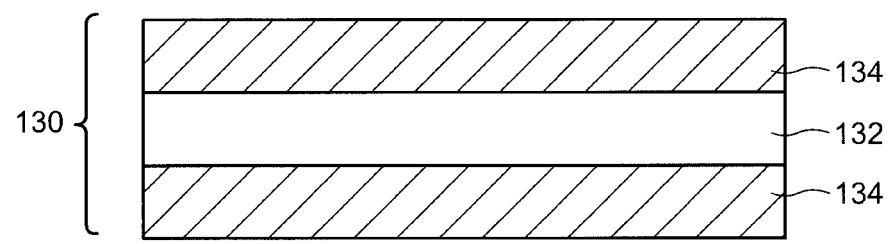

The separator 130 is disposed between the positive electrode 110 and the negative electrode 120 and serves as a film having a role of separating the positive electrode 110 and the negative electrode 120 and transporting the electrolyte solution 140 in the secondary battery 100. A schematic cross-sectional view of the separator 130 is shown in FIG. 1B. The separator 130 has a first layer 132 including a porous polyolefin and may further possess a porous layer 134 as an optional structure. The separator 130 may have a structure in which two porous layers 134 sandwich the first layer 132 as shown in FIG. 1B, or a structure in which the porous layer 134 is disposed only on one surface of the first layer 132. Alternatively, a structure may be employed where no porous layer 134 is provided. The first layer 132 may have a single-layer structure or may be structured with a plurality of layers.

The first layer 132 has internal pores linked to each other. This structure allows the electrolyte solution 140 to permeate the first layer 132 and enables carrier ions such as lithium ions to be transported via the electrolyte solution 140. At the same time, physical contact between the positive electrode 110 and the negative electrode 120 is inhibited. On the other hand, when the secondary battery 100 has a high temperature, the first layer 132 melts and the pores disappear, thereby stopping the transportation of the carrier ions. This behavior is called shutdown. This behavior prevents heat generation and ignition caused by a short-circuit between the positive electrode 110 and the negative electrode 120, by which high safety is secured.

The first layer 132 includes a porous polyolefin. Alternatively, the first layer 132 may be structured with a porous polyolefin. Namely, the first layer 132 may be configured so as to include only a porous polyolefin or substantially include only a porous polyolefin. The porous polyolefin may contain an additive. In this case, the first layer 132 may be structured only with the polyolefin and the additive or substantially only with the polyolefin and the additive. When the porous polyolefin contains the additive, the first layer 132 may be composed of only the polyolefin and the additive or may be composed of substantially only the polyolefin and the additive. When the porous polyolefin contains the additive, the polyolefin may be included in the porous polyolefin at a composition equal to or higher than 95 wt %, equal to or higher than 97 wt %, or equal to or higher than 99%. Furthermore, the polyolefin may be included in the first layer 132 at a composition equal to or higher than 95 wt %, equal to or higher than 97 wt %, or equal to or higher than 99 wt %. A content of the polyolefin included in the porous film may be 100 wt % or equal to or less than 100 wt %. As the additive, an organic compound (organic additive) is represented, and the organic compound may be an antioxidant (organic antioxidant) or a lubricant.

As the polyolefin structuring the porous polyolefin, a homopolymer obtained by polymerizing an α-olefin such as ethylene, propylene, 1-butene, 4-methyl-1-pentene, and 1-hexene or a copolymer thereof is represented. A mixture of these homopolymers and copolymers or a mixture of the homopolymers or copolymers having different molecular weights may be included in the first layer 132. That is, the molecular-weight distribution of the polyolefin may have a plurality of peaks. The organic additive may have a function to prevent oxidation of the polyolefin, and phenols or phosphoric esters may be employed as the organic additive, for example. Phenols having a bulky substituent such as a t-butyl group at an α-position and/or a β-position of a phenolic hydroxy group may be also used.

As a typical polyolefin, a polyethylene-based polymer is represented. When a polyethylene-based polymer is used, a low-density polyethylene or a high-density polyethylene may be used. Alternatively, a copolymer of ethylene with an α-olefin may be used. These polymers or copolymers may be a high-molecular weight polymer with a weight-average molecular weight equal to or higher than 100,000 or an ultrahigh-molecular weight polymer with a weight-average molecular weight of equal to or higher than 1,000,000. The use of a polyethylene-based polymer enables the shutdown function to be realized at a lower temperature, thereby providing high safety to the secondary battery 100. Moreover, mechanical strength of the separator can be increased by using an ultrahigh-molecular weight polymer with a weight-average molecular weight of equal to or higher than 1,000,000.

A thickness of the first layer 132 is appropriately determined in view of thicknesses of other members in the secondary battery 100 and may be equal to or larger than 4 μm and equal to or smaller than 40 μm, equal to or larger than 5 μm and equal to or smaller than 30 μm, or equal to or larger than 6 μm and equal to or smaller than 15 μm.

A weight per unit area of the first layer 132 is appropriately determined in view of its strength, thickness, weight, and handleability. For example, the weight per unit area may be equal to or more than 4 g/m$^2$ and equal to or less than 20 g/m$^2$, equal to or more than 4 g/m$^2$ and equal to or less than 12 g/m$^2$, or equal to or more than 5 g/m$^2$ and equal to or less than 10 g/m$^2$, by which a weight-energy density and a volume-energy density of the secondary battery 100 can be increased. Note that a weight per unit area is a weight per unit area.

With respect to gas permeability of the first layer 132, its Gurley value may be selected from a range equal to or higher than 30 s/100 mL and equal to or lower than 500 s/100 mL or equal to or higher than 50 s/100 mL and equal to or lower than 300 s/100 mL so that sufficient ion-permeability can be obtained.

A porosity of the first layer 132 may be selected from a range equal to or more than 20 vol % and equal to or less than 80 vol % or equal to or more than 30 vol % and equal to or less than 75 vol % so that a retention volume of the electrolyte solution 140 is increased and the shutdown function is surely realized. A diameter of the pore (average pore diameter) in the first layer 132 may be selected from a range equal to or larger than 0.01 μm and equal to or smaller than 0.3 μm or equal to or larger than 0.01 μm and equal to or smaller than 0.14 μm so that a sufficient ion-permeability and a high shutdown function can be obtained.

1-1. Property

The first layer 132 has a parameter X, defined by the following equation, equal to or more than 0 and equal to or less than 20 and a white index (hereinafter, referred to as WI) equal to or more than 85 and equal to or less than 98. Here, MD tan δ and TD tan δ are respectively a loss tangent in a flow direction (also called a machine direction MD) and a loss tangent in a width direction (also called a transverse direction TD) obtained by a viscoelasticity measurement of the first layer at a temperature of 90° C. and a frequency of 10 Hz.

$$X = 100 \frac{|MD\tan\delta - TD\tan\delta|}{\frac{|MD\tan\delta + TD\tan\delta|}{2}}$$

A loss tangent obtained by a dynamic viscoelasticity measurement of a substance (hereinafter, referred to as a tan δ) is represented by an equation $\tan \delta = E''/E'$ using a storage modulus E' and a loss modulus E''. The loss modulus indicates irreversible deformability to a stress, while the storage modulus indicates reversible deformability to a stress. Thus, the tan δ indicates deformation conformability of a substance to a change of a force applied from the exterior. A decrease in anisotropy of the tan δ in a plane direction of a substrate makes the deformation conformability of the substance with respect to the change of a force applied from the exterior isotropic and allows the substance to uniformly deform in the plane direction.

In the secondary battery such as a nonaqueous electrolyte-solution secondary battery, a pressure and a shearing force in a plane direction are applied to the separator because the electrodes (positive electrode 110 and the negative electrode 120) expand and shrink during charging/discharging. At this time, if the deformation compatibility of the first layer 132 structuring the separator is isotropic, the separator uniformly deforms. Hence, anisotropy of the stress generated in the first layer 132 due to the periodic deformation of the electrodes in a charging/discharging cycle is reduced. Accordingly, separation of the positive-electrode active-substance layer 114 and the negative-electrode active-substance layer 124 hardly occurs, an increase in internal resistance of the secondary battery is prevented, and the cycle characteristics are improved.

In addition, it is expected from the time-temperature conversion rule relating to the stress-relaxation process of a polymer that the frequency obtained by converting the dynamic viscoelasticity measurement at a frequency of 10 Hz and a temperature of 90° C. into a measurement using, as a standard, a temperature range ranging from approximately 20 to 60° C., which corresponds to a temperature at which a secondary battery is normally operated, is much lower than 10 Hz and close to a time scale of the expansion-shrink motion of the electrodes caused by the charging/discharging cycle of a secondary battery. Therefore, a dynamic viscoelasticity measurement at 10 Hz and 90° C. enables rheology evaluation so as to correspond to the time scale of the charging/discharging cycle in the temperature range in which a secondary battery is used.

The anisotropy of the tan δ is evaluated by the parameter X defined by the above equation. When this parameter X is equal to or more than 0 and equal to or less than 20 or equal to or more than 2 and equal to or less than 20, it is possible to suppress an increase in internal resistance of a secondary battery during a charging/discharging cycle.

The WI is an index indicating hue (whiteness), and a high WI means a high whiteness. A decrease in WI (i.e., low whiteness) suggests an increase in the number of functional groups such as a carboxyl group at the surface or in the first layer 132. Since a polar functional group such as a carboxyl group inhibits permeation of carrier ions (that is, permeability is reduced), it is considered that the battery performance of the secondary battery 100 decreases with decreasing WI.

In the case where the WI of the first layer 132 is equal to or more than 85 and equal to or less than 98, the amount of functional groups included at the surface and in the first layer 132 is suitable for maintaining the carrier-ion permeability. Hence, it is possible to adjust the carrier-ion permeability of the first layer 132 within a suitable range. As a result, the use of the first layer 132 having the WI falling within the aforementioned range prevents reduction in battery performance of a secondary battery.

On the other hand, when the WI of the first layer 132 is less than 85, the carrier-ion permeability of the first layer 132 decreases because the amount of functional groups at the surface and in the first layer 132 is large. Accordingly, the rate characteristic decreases.

When the WI of the first layer 132 exceeds 98, transportation of the carrier ions is inhibited due to the amount of the surface functional groups decreasing too much, which results in a reduction in affinity of the first layer 132 to the electrolyte solution 140.

As experimentally proven in the Examples described below, it was found that an increase in internal resistance of a secondary battery in the charging/discharging cycle can be suppressed by using the separator 132 including the first layer 132 which satisfies the aforementioned parameters.

Note that a piercing strength of the first layer 132 is preferably equal to or larger than 3 N and equal to or smaller than 10 N or equal to or larger than 3 N and equal to or smaller than 8 N. This range prevents the separator 130 including the first layer 132 from being destroyed when a pressure is applied to the secondary battery from the exterior during a fabrication process and also prevents a short-circuit between the positive electrode and the negative electrode.

2. Electrode

As described above, the positive electrode 110 may include the positive-electrode current collector 112 and the positive-electrode active-substance layer 114. Similarly, the negative electrode 120 may include the negative-electrode current collector 122 and the negative-electrode active-substance layer 124 (see FIG. 1A). The positive-electrode current collector 112 and the negative-electrode current collector 122 respectively possess the positive-electrode active-substance layer 114 and the negative-electrode active-substance layer 124 and have functions to supply current to the positive-electrode active-substance layer 114 and the negative-electrode active-substance layer 124, respectively.

A metal such as nickel, copper, titanium, tantalum, zinc, iron, and cobalt or an alloy such as stainless steel including these metals can be used for the positive-electrode current collector 112 and the negative-electrode current collector 122, for example. The positive-electrode current collector 112 and the negative-electrode current collector 122 may have a structure in which a plurality of layers including these metals is stacked.

The positive-electrode active-substance layer 114 and the negative-electrode active-substance layer 124 respectively include a positive-electrode active substance and a negative-electrode active substance. The positive-electrode active substance and the negative-electrode active substance have a role to release and absorb carrier ions such as lithium ions.

As a positive-electrode active substance, a material capable of being doped or de-doped with carrier ions is represented, for example. Specifically, a lithium-based composite oxide containing at least one kind of transition metals such as vanadium, manganese, iron, cobalt, and nickel is represented. As such a composite oxide, a lithium-based composite oxide having an α-NaFeO$_2$-type structure, such as lithium nickelate and lithium cobalate, and a lithium-based composite oxide having a spinel-type structure, such as lithium manganese spinel, are given. These composite oxides have a high average discharge potential.

The lithium-based composite oxide may contain another metal element and is exemplified by lithium nickelate (composite lithium nickelate) including an element selected from titanium, zirconium, cerium, yttrium, vanadium, chromium, manganese, iron, cobalt, copper, silver, magnesium, aluminum, gallium, indium, tin, and the like, for example. These metals may be adjusted to be equal to or more than 0.1 mol % and equal to or less than 20 mol % to the metal elements in the composite lithium nickelate. This structure provides the secondary battery 100 with excellent cycle characteristics when used at a high capacity. For example, a composite lithium nickelate including aluminum or manganese and containing nickel at 85 mol % or more or 90 mol % or more may be used as the positive-electrode active substance.

Similar to the positive-electrode active substance, a material capable of being doped and de-doped with carrier ions can be used as the negative-electrode active substance. For example, a lithium metal or a lithium alloy is represented. Alternatively, it is possible to use a carbon-based material such as graphite exemplified by natural graphite and artificial graphite, cokes, carbon black, and a sintered polymeric compound exemplified by carbon fiber; a chalcogen-based compound capable of being doped and de-doped with lithium ions at a potential lower than that of the positive electrode, such as an oxide and a sulfide; an element capable of being alloyed or reacting with an alkaline metal, such as aluminum, lead, tin, bismuth, and silicon; an intermetallic compound of cubic system (AlSb, Mg$_2$Si, NiSi$_2$) undergoing alkaline-metal insertion between lattices; lithium-nitride compound (Li$_{3-x}$M$_x$N (M: transition metal)); and the like. Among the negative-electrode active substances, the carbon-based material including graphite such as natural graphite and artificial graphite as a main component provides a large energy density due to high potential uniformity and a low average discharge potential when combined with the positive electrode 110. For example, it is possible to use, as the negative-electrode active substance, a mixture of graphite and silicon with a ratio of silicon to carbon equal to or larger than 5 mol % and equal to or smaller 10 mol %.

The positive-electrode active-substance layer 114 and the negative-electrode active-substance layer 124 may each further include a conductive additive and binder other than the aforementioned positive-electrode active substance and the negative-electrode active substance.

As a conductive additive, a carbon-based material is represented. Specifically, graphite such as natural graphite and artificial graphite, cokes, carbon black, pyrolytic carbons, and a sintered polymeric compound such as carbon fiber are given. A plurality of materials described above may be mixed to use as a conductive additive.

As a binder, poly(vinylidene fluoride) (PVDF), polytetrafluoroethylene, poly(vinylidene fluoride-co-hexafluoropropylene), poly(tetrafluoroethylene-co-hexafluoropropylene), poly(tetrafluoroethylene-co-perfluoroalkyl vinyl ether), poly(ethylene-co-tetrafluoroethylene), a copolymer in which vinylidene fluoride is used as a monomer, such as a poly(vinylidene fluoride-co-hexafluoropropylene-co-tetrafluoroethylene), a thermoplastic resin such as a thermoplastic polyimide, polyethylene, and polypropylene, an acrylic resin, styrene-butadiene rubber, and the like are represented. Note that a binder may further have a function as a thickener.

The positive electrode 110 may be formed by applying a mixture of the positive-electrode active substance, the conductive additive, and the binder on the positive-electrode current collector 112, for example. In this case, a solvent may be used to form or apply the mixture. Alternatively, the positive electrode 110 may be formed by applying a pressure to the mixture of the positive-electrode active substance, the conductive additive, and the binder to process the mixture and arranging the processed mixture on the positive electrode 110. The negative electrode 120 can also be formed with a similar method.

3. Electrolyte Solution

The electrolyte solution 140 includes the solvent and an electrolyte, and at least a part of the electrolyte is dissolved in the solvent and electrically dissociated. As the solvent, water and an organic solvent can be used. In the case where the secondary battery 100 is utilized as a nonaqueous electrolyte-solution secondary battery, an organic solvent is used. As an organic solvent, carbonates such as ethylene carbonate, propylene carbonate, dimethyl carbonate, diethyl carbonate, ethyl methyl carbonate, and 1,2-di(methoxycarbonyloxy)ethane; ethers such as 1,2-dimethoxyethane, 1,3-dimethoxypropane, tetrahydrofuran, and 2-methyltetrahydrofuran; esters such as methyl formate, methyl acetate, and γ-butyrolactone; nitriles such as acetonitrile and butyronitrile; amides such as N,N-dimethylformamide and N,N-dimethylacetamide; carbamates such as 3-methyl-2-oxazolidone, sulfur-containing compounds such as sulfolane, dimethyl sulfoxide, and 1,3-propanesultone; a fluorine-containing organic solvent in which fluorine is introduced to the aforementioned organic solvent; and the like are represented. A mixed solvent of these organic solvents may also be employed.

As a typical electrolyte, a lithium salt is represented. For example, LiClO$_4$, LiPF$_6$, LiAsF$_6$, LiSbF$_6$, LiBF$_4$, LiCF$_3$SO$_3$, LiN(CF$_3$SO$_2$)$_2$, LiC(CF$_3$SO$_2$)$_3$, Li$_2$B$_{10}$Cl$_{10}$, a lithium salt of a carboxylic acid having 2 to 6 carbon atoms, LiAlCl$_4$, and the like are represented. Just one kind of the lithium salts mentioned above may be used, and more than two kinds of lithium salts may be combined.

Note that, in a broad sense, an electrolyte may mean a solution of an electrolyte. However, in the present specification and claims, a narrow sense is employed. That is, an electrolyte is a solid and is electrically dissociated upon dissolving in a solvent to provide an ion conductivity to the resulting solution.

4. Fabrication Process of Secondary Battery

As shown in FIG. 1A, the negative electrode 120, the separator 130, and the positive electrode 110 are arranged to form a stacked body. After that, the stacked body is disposed in a housing which is not illustrated. The secondary battery 100 can be fabricated by filling the housing with the electrolyte solution and sealing the housing while reducing a pressure in the housing or by sealing the housing after filing the housing with the electrolyte solution while reducing a pressure in the housing. A shape of the secondary battery 100 is not limited and may be a thin-plate (paper) form, a disc form, a cylinder form, a prism form such as a rectangular parallelepiped, or the like.

<Second Embodiment>

In the present embodiment, a method for preparing the first layer 132 described in the First Embodiment is described. An explanation of the structures the same as those of the First Embodiment may be omitted.

A method for preparing the first layer 132 includes (1) a process for obtaining a polyolefin composite by kneading an ultrahigh-molecular weight polyethylene, a low-molecular weight hydrocarbon, and a pore-forming agent, (2) a process for forming a sheet by rolling the polyolefin composite with a rolling roll (rolling process), (3) a process for removing the pore-forming agent from the sheet obtained in the process (2), and (4) a process for processing into a film state by stretching the sheet obtained in the process (3).

A shape of the ultrahigh-molecular weight polyolefin is not limited, and a polyolefin processed into a powder state may be used. As the low-molecular weight hydrocarbon, a low-molecular weight polyolefin such as polyolefin wax and a low-molecular weight polymethylene such as Fisher-Tropsh wax are represented. A weight-average molecular weights of the low-molecular weight polyolefin and the low-molecular weight polymethylene are equal to or higher than 200 and equal to or lower than 3000, for example, by which the low-molecular weight hydrocarbon can be prevented from being volatilized and can be homogeneously mixed with the ultrahigh-molecular weight polyolefin. Note that a polymethylene is defined as a kind of polyolefin in the present specification and claims.

In the process (1), the ultrahigh-molecular weight polyolefin and the low-molecular weight polyolefin may be mixed with a mixer (first-step mixing), and the mixture may be mixed again (second-step mixing) after adding the pore-forming agent into the mixture, for example. In the first-step mixing, an organic compound such as an antioxidant may be added. The ultrahigh-molecular weight polyolefin and the low-molecular weight polyolefin can be uniformly mixed, and the ultrahigh-molecular weight polyolefin, the low-molecular weight polyolefin, and the pore-forming agent can also be uniformly mixed by performing the two-step mixing. The uniform mixing of these materials, especially that of the ultrahigh-molecular weight polyolefin and the low-molecular weight polyolefin can be confirmed by an increase in bulk density of the mixture. The uniform mixing promotes uniform crystallization, which results in uniform crystal distribution and reduced anisotropy of the tan δ. It is preferred that there be an interval equal to or more than 1 minute between the first-step mixing and the addition of the pore-forming agent.

The pore-forming agent used in the process (1) may include an organic substance or an inorganic substance. A plasticizer may be used as the organic substance, for example, which is exemplified by a low-molecular weight hydrocarbon such as a liquid paraffin.

As the inorganic filling agent, an inorganic material soluble in a neutral, acidic, or alkaline solvent is represented, and calcium carbonate, magnesium carbonate, barium carbonate, and the like are exemplified. Other than these materials, an inorganic compound such as calcium chloride, sodium chloride, and magnesium sulfate is represented.

At this time, the use of a pore-forming agent having a BET (Brunauer-Emmett-Teller) specific surface area equal to or larger than 6 $m^2/g$ and equal to or smaller than 16 $m^2/g$, equal to or larger than 8 $m^2/g$ and equal to or smaller than 15 $m^2/g$, or equal to or larger than 10 $m^2/g$ and equal to or smaller than 13 $m^2/g$ increases dispersibility of the pore-forming agent and prevents local oxidation of the first layer 132 when processing. Thus, formation of a functional group such as a carboxylic group in the first layer 132 is prevented, and pores having a small average pore diameter can be uniformly distributed. As a result, the first layer 132 with the WI equal to or more than 85 and equal to or less than 98 can be obtained.

In the process (3) for removing the pore-forming agent, a solution of water or organic solvent to which an acid or a base is added, or the like is used as a cleaning solution. A surfactant may be added to the cleaning solution. An addition amount of the surfactant can be arbitrarily selected from a range equal to or more than 0.1 wt % to 15 wt % or equal to or more than 0.1 wt % and equal to or less than 10 wt %. It is possible to secure a high cleaning efficiency and prevent the surfactant from being left by selecting the addition amount from this range. A cleaning temperature may be selected from a temperature range equal to or higher than 25° C. and equal to or lower than 60° C., equal to or higher than 30° C. and equal to or lower than 55° C., or equal to or higher than 35° C. and equal to or lower than 50° C., by which a high cleaning efficiency can be obtained and evaporation of the cleaning solution can be avoided.

In the process (3), water cleaning may be further conducted after removing the pore-forming agent with the cleaning solution. The temperature in the water cleaning may be selected from a temperature range equal to or higher than 25° C. and equal to or lower than 60° C., equal to or higher than 30° C. and equal to or lower than 55° C., or equal to or higher than 35° C. and equal to or lower than 50° C.

The stretched first layer 132 may be annealed (thermal fixation) in the process (4). An oriented and crystallized region formed by being stretched and an amorphous region are mixed in the stretched first layer 132. The amorphous region is reconstructed (clustered) by the annealing treatment, by which dynamic nonuniformity in a microregion disappears.

In view of molecular motion of the polyolefin molecules to be used, an annealing temperature can be selected from a range equal to or higher than (Tm−30° C.) and lower than Tm, equal to or higher than (Tm−20° C.) and lower than Tm, or equal to or higher than (Tm−10° C.) and lower than Tm where Tm is a melting point of the ultrahigh-molecular weight polyolefin. Selection from these temperature ranges dispels the dynamic nonuniformity and prevents the pores from closing.

<Third Embodiment>

In the present embodiment, an embodiment in which the separator 130 has the porous layer 134 in addition to the first layer 132 is explained.

1. Structure

As described in the First Embodiment, the porous layer 134 may be disposed on one side or both sides of the first layer 132 (see FIG. 1B). When the porous layer 134 is stacked on one side of the first layer 132, the porous layer 134 may be arranged on a side of the positive electrode 110 or on a side of the negative electrode 120 of the first layer 132.

The porous layer 134 is insoluble in the electrolyte solution 140 and is preferred to include a material chemically stable in a usage range of the second battery 100. As such a material, it is possible to represent a polyolefin such as polyethylene, polypropylene, polybutene, poly(ethylene-co-propylene); a fluorine-containing polymer such as poly (vinylidene fluoride) (PVDF), polytetrafluoroethylene, poly (vinylidene fluoride-co-hexafluoropropylene), poly(tetrafluoroethylene-co-hexafluoropropylene), poly(vinylidene fluoride-co-hexafluoropropylene-co-tetrafluoroethylene), and poly(ethylene-co-tetrafluoroethylene); an aromatic polyimide (aramid); rubber such as poly(styrene-co-butadiene) and a hydride thereof, a copolymer of methacrylic esters, a poly(acrylonitrile-co-acrylic ester), a poly(styrene-co-acrylic ester), ethylene-propylene rubber, and poly(vinyl acetate); a polymer having a melting point and a glasstransition temperature of 180° C. or more, such as poly (phenylene ether), a polysulfone, a poly(ether sulfone), polyphenylenesulfide, a poly(ether imide), a polyamide-imide, a polyether-amide, and a polyester; a water-soluble polymer such as poly(vinyl alcohol), poly(ethylene glycol), a cellulose ether, sodium alginate, poly(acrylic acid), polyacrylamide, poly(methacrylic acid); and the like.

As an aromatic polyamide, poly(paraphenylene terephthalamide), poly(metaphenylene isophthalamide), poly(parabenzamide), poly(metabenzamide), poly(4,4'-benzanilide terephthalamide), poly(paraphenylene-4,4'-biphenylenecarboxylic amide), poly(metaphenylene-4,4'-biphenylenecarboxilic amide), poly(paraphenyelnee-2,6-natphthalenedicarboxlic amide), poly(metaphenyelnee-2,6-natphthalenedicarboxlic amide), poly(2-chloroparaphenylene terephthalamide), a copolymer of paraphenylene terephthalamide with 2,6-dichloroparaphenylene terephthalamide, a copolymer of metaphenylene terephthalamide with 2,6-dichloroparaphenylene terephthalamide, and the like are represented, for example.

The porous layer 134 may include a filler. A filler consisting of an organic substance or an inorganic substance is represented as a filler. A filler called a filling agent and consisting of an inorganic substance is preferred. A filler consisting of an inorganic oxide such as silica, calcium oxide, magnesium oxide, titanium oxide, alumina, mica, zeolite, aluminum hydroxide, boehmite, and the like is more preferred, at least one kind of filler selected from a group consisting of silica, magnesium oxide, titanium oxide, aluminum hydroxide, boehmite, and alumina is further preferred, and alumina is especially preferred. Alumina has a number of crystal forms such as α-alumina, β-alumina, γ-alumina, θ-alumina, and the like, and any of the crystal forms can be appropriately used. Among them, α-alumina is most preferable due to its particularly high thermal stability and chemical stability. Just one kind of filler may be used, or two or more kinds of filler may be combined in the porous layer 134.

No limitation is provided to a shape of the filler, and the filler may have a sphere shape, a cylindrical shape, an elliptical shape, a gourd shape, and the like. Alternatively, a filler in which these shapes are mixed may be used.

When the porous layer 134 includes the filler, an amount of the filler to be included may be equal to or larger than 1 vol % and equal to or smaller than 99 vol % or equal to or larger than 5 vol % and equal to or smaller than 95 vol % with respect to the porous layer 134. The aforementioned range of the amount of the filler to be included prevents the space formed by contact between the fillers from being closed by the material of the porous layer 134, which leads to sufficient ion permeability and allows its weight per unit area to be adjusted.

A thickness of the porous layer 134 can be selected from a range equal to or larger than 0.5 μm and equal to or smaller than 15 μm or equal to or larger than 2 μm and equal to or smaller than 10 μm. Hence, when the porous layers 134 are formed on both sides of the first layer 132, a total thickness of the porous layers 134 may be selected from a range equal to or larger than 1.0 μm and equal to or smaller than 30 μm or equal to or larger than 4 μm and equal to or smaller than 20 μm.

When the total thickness of the porous layers 134 is arranged to be equal to or larger than 1.0 μm, internal short-circuits caused by damage to the secondary battery 100 can be more effectively prevented. The total thickness of the porous layers 134 equal to or smaller than 30 μm prevents an increase in permeation resistance of the carrier ions, thereby preventing deterioration of the positive electrode 110 and a decrease in battery performance and cycle characteristic resulting from an increase in permeation resistance of the carrier ions. Moreover, it is possible to avoid an increase in distance between the positive electrode 110 and the negative electrode 120, which contributes to miniaturization of the secondary battery 100.

The weight per unit area of the porous layer 134 may be selected from a range equal to or more than 1 $g/m^2$ and equal to or less than 20 $g/m^2$ or equal to or more than 2 $g/m^2$ and equal to or less than 10 $g/m^2$. This range increases an energy density per weight and energy density per volume of the secondary battery 100.

A porosity of the porous layer 134 may be equal to or more than 20 vol % and equal to or less than 90 vol % or equal to or more than 30 vol % and equal to or less than 80 vol %. This range allows the porous layer 134 to have sufficient ion permeability. An average porous diameter of the pores included in the porous layer 134 may be selected from a range equal to or larger than 0.01 μm and equal to or smaller than 1 μm or equal to or larger than 0.01 μm and equal to or smaller than 0.5 μm, by which a sufficient ion permeability is provided to the secondary battery 100 and the shutdown function can be improved.

A gas permeability of the separator 130 including the aforementioned first layer 132 and the porous layer 134 may be equal to or higher than 30 s/100 mL and equal to or lower than 1000 s/100 mL or equal to or higher than 50 s/100 mL and equal to or lower than 800 s/100 L in a Gurley value, which enables the separator 130 to have sufficient strength, maintain a high shape stability at a high temperature, and possess sufficient ion permeability.

2. Preparation Method

When the porous layer 134 including the filler is prepared, the aforementioned polymer or resin is dissolved or dispersed in a solvent, and then the filler is dispersed in this mixed liquid to form a dispersion (hereinafter, referred to as a coating liquid). As a solvent, water; an alcohol such as methyl alcohol, ethyl alcohol, n-propyl alcohol, isopropyl alcohol, and t-butyl alcohol; acetone, toluene, xylene, hexane, N-methylpyrrolidone, N,N-dimethylacetamide, N,N-dimethylformamide; and the like are represented. Just one kind of solvent may be used, or two or more kinds of solvents may be used.

When the coating liquid is prepared by dispersing the filler to the mixed liquid, a mechanical stirring method, an ultrasonic dispersing method, a high-pressure dispersion method, a media dispersion method, and the like may be applied. In addition, after the filler is dispersed in the mixed liquid, the filler may be subjected to wet milling by using a wet-milling apparatus.

An additive such as a dispersant, a plasticizer, a surfactant, or a pH-adjusting agent may be added to the coating liquid.

applied on the first layer 132. For example, the porous layer 134 can be formed over the first layer 132 by directly coating the first layer 132 with the coating liquid by using a dip-coating method, a spin-coating method, a printing method, a spraying method, or the like and then removing the solvent. Instead of directly applying the coating liquid over the first layer 132, the porous layer 134 may be transferred onto the first layer 132 after being formed on another supporting member. As a supporting member, a film made of a resin, a belt or drum made of a metal may be used.

Any method selected from natural drying, fan drying, heat drying, and vacuum drying may be used to remove the solvent. Drying may be conducted after substituting the solvent with another solvent (e.g., a solvent with a low boiling point). When heating, drying may be carried out at 10° C. or higher and 120° C. or lower or at 20° C. or higher and 80° C. or lower. This temperature range avoids a reduction in gas permeability caused by shrinkage of the pores in the first layer 132.

A thickness of the porous layer 134 can be controlled by a thickness of the coating film in a wet state after coating, an amount of the filler included, a concentration of the polymer and the resin, and the like.

Example

1. Preparation of Separator

An example for preparing the separator 130 is described below.

1-1. Example 1

After mixing 68 wt % of ultrahigh-molecular weight polyethylene powder (GUR2024 manufactured by Ticona) and 32 wt % of polyethylene wax (FNP-0115, manufactured by Nippon Seiro Co. Ltd.) having a weight-average molecular weight of 1000, 0.4 weight portions of an antioxidant (Irg1010, manufactured by CIBA Speciality Chemicals), 0.1 weight portions of an antioxidant (P168 manufactured by CIBA Speciality Chemicals®), and 1.3 weight portions of sodium stearate with respect to 100 weight portions of the summation of the ultrahigh-molecular weight polyethylene and the polyethylene wax were added, and these materials are mixed in a powder state at a rotation rate of 440 rpm for 70 seconds by using a Henschel mixer. Next, calcium carbonate (manufactured by Maruo Calcium Co. LTD.) with an average particle diameter of 0.1 μm and a BET specific surface area of 11.8 $m^2$/g was added so that its proportion to the entire volume is 38 vol %, and these materials were mixed in the Henschel mixer at a rotation rate of 440 rpm for 80 seconds. At this stage, a light-duty bulk density of the powder was approximately 500 g/L. The resulting mixture was kneaded while melting in a twin-screw kneader to obtain a polyolefin-resin composite. The polyolefin-resin composite was rolled with a pair of rollers at a surface temperature of 150° C. to result in a sheet. This sheet was dipped in hydrochloric acid (4 mol/L) including 0.5 wt % of a nonionic surfactant to remove calcium carbonate, sequentially stretched to 6.2 times in a lateral direction at 100° C., and then annealed at 126° C. (a melting point of the polyolefin-resin composite 134° C.–8° C.) to obtain the separator 130.

1-2. Example 2

The separator 130 was obtained with the same method as the Example 1 except that 68.5 wt % of GUR4032 manufactured by Ticona was used as the ultrahigh-molecular weight polyethylene powder, 31.5 wt % of the polyethylene wax was used, calcium carbonate (manufactured by Maruo Calcium Co. LTD.) with an average particle diameter of 0.1 μm and a BET specific surface area of 11.8 $m^2$/g was used as the calcium carbonate, the sheet was stretched to 7.0 times, and the annealing was carried out at 123° C. (a melting point of the polyolefin-resin composite 133° C.–10° C.).

1-3. Example 3

The separator 130 was obtained with the same method as the Example 1 except that 70 wt % of the ultrahigh-molecular weight polyethylene powder was used, 30 wt % of the polyethylene wax was used, 37 vol % of the calcium carbonate was used, calcium carbonate (manufactured by Maruo Calcium Co. LTD.) with an average particle diameter of 0.1 μm and a BET specific surface area of 11.6 $m^2$/g was used as the calcium carbonate, the sheet was stretched to 6.2 times, and the thermal-fixation treatment was carried out at 120° C. (a melting point of the polyolefin-resin composite 133° C.–13° C.).

An example for preparing separators used as Comparative Examples is described below.

1-4. Comparative Example 1

To 80 wt % of ultrahigh-molecular weight polyethylene powder (GUR4032 manufactured by Ticona) and 20 wt % of polyethylene wax (FNP-0115 manufactured by Nippon Seiro Co. Ltd.) having a weight-average molecular weight of 1000 were added 0.4 weight portions of an antioxidant (Irg1010 manufactured by CIBA Speciality Chemicals), 0.1 weight portions of an antioxidant (P168 manufactured by CIBA Speciality Chemicals), and 1.3 weight portions of sodium stearate with respect to 100 weight portions of the summation of the ultrahigh-molecular weight polyethylene and the polyethylene. At the same time, calcium carbonate (manufactured by Maruo Calcium Co. LTD.) with an average particle diameter of 0.1 μm and a BET specific surface area of 11.6 $m^2$/g was further added so that its proportion to the entire volume is 38 vol %, and these materials were mixed in a Henschel mixer at a rotation rate of 440 rpm for 150 seconds. At this stage, a light-duty bulk density of the powder was approximately 350 g/L. The obtained mixture was kneaded while melting in a twin-screw kneader to obtain a polyolefin-resin composite. This polyolefin-resin composite was rolled with a pair of rollers having a surface temperature of 150° C., resulting in a sheet. This sheet was dipped in hydrochloric acid (4 mol/L) including 0.5 wt % of a nonionic surfactant to remove calcium carbonate, sequentially stretched to 4.0 times in a lateral direction, and further annealed at 120° C. (a melting point of the polyolefin-resin composite 132° C.–12° C.) to obtain a separator of a Comparative Example 1.

1-5. Comparative Example 2

A commercially available polyolefin porous film (#2400 manufactured by Celgard, LLC.) was used as a comparative separator.

2. Fabrication of Secondary Battery

A method for fabricating the secondary batteries including the separators of the Examples 1 to 3 and Comparative Examples 1 and 2 is described below.

2-1. Positive Electrode

A commercially available positive electrode manufactured by applying a stack of $LiNi_{0.5}Mn_{0.3}Co_{0.2}O_2$/conductive material/PVDF (weight ratio of 92/5/3) on an aluminum foil was processed. Here, $LiNi_{0.5}Mn_{0.3}Co_{0.2}O_2$ is an active-substance layer. Specifically, the aluminum foil was cut so that a size of the positive-electrode active-substance layer is 45 mm×30 mm and that a portion with a width of 13 mm, in which the positive-electrode active-substance layer is not formed, was left in a periphery and was used as a positive electrode in the following fabrication process. A thickness, a density, and a positive-electrode capacity of the positive-electrode active-substance layer were 58 μm, 2.50 g/$cm^3$, and 174 mAh/g, respectively.

2-2. Negative Electrode

A commercially available negative electrode manufactured by applying graphite/poly(styrene-co-1,3-butadiene)/carboxymethyl cellulose sodium salt (weight ratio of 98/1/1) on a copper foil was used. Here, the graphite functions as a negative-electrode active-substance layer. Specifically, the copper foil was cut so that a size of the negative-electrode active-substance layer is 50 mm×35 mm and that a portion with a width of 13 mm, in which the negative-electrode active-substance layer is not formed, was left in a periphery and was used as a negative electrode in the following fabrication process. A thickness, a density, and a negative-electrode capacity of the negative-electrode active-substance layer were 49 μm, 1.40 g/cm$^3$, and 372 mAh/g, respectively.

2-3. Fabrication

The positive electrode, the separator, and the negative electrode were stacked in the order in a laminated pouch to obtain a stacked body. At this time, the positive electrode and the negative electrode were arranged so that the entire top surface of the positive-electrode active-substance layer overlaps with a main surface of the negative-electrode active-substance layer.

Next, the stacked body was arranged in an envelope-shaped housing formed by stacking an aluminum layer and a heat-seal layer, and 0.25 mL of an electrolyte solution was added into the housing. A mixed solution in which LiPF$_6$ was dissolved at 1.0 mol/L in a mixed solvent of ethyl methyl carbonate, diethyl carbonate, and ethylene carbonate with a volume ratio of 50:20:30 was used as the electrolyte solution. The secondary battery was fabricated by heat-sealing the housing while reducing the pressure in the housing. A designed capacity of the secondary battery was 20.5 mAh.

3. Evaluation

The physical properties of the separators according to the Examples 1 to 3 and the Comparative Examples 1 and 2 as well as the evaluation results of the performance of the secondary batteries including the separators are described below.

3-1. Thickness

The thicknesses were measured using a High-Resolution Digital Measuring Unit manufactured by Mitsutoyo Corporation.

<3-2. Light-Duty Bulk Density>

The light-duty bulk density was measured according to JIS R9301-2-2.

<3-3. Melting Point>

Approximately 50 mg of the separator was charged in a pan made of aluminum, and a DSC (Differential Scanning calorimetry) thermogram was obtained at a temperature-elevating rate of 20° C./min using a differential scanning calorimeter EXSTAR 6000 manufactured by Seiko Instruments Inc. A melting peak top at around 140° C. was employed as the melting point Tm of the separator.

<Dynamic Viscoelasticity Measurement>

The dynamic viscoelasticity measurement of the separator was carried out using a dynamic viscoelastic analyzer itk DVA-225 manufactured by itk Inc. under the conditions of a measurement frequency of 10 Hz and a measurement temperature of 90° C.

Specifically, the tan δ in a flow direction (MD tan δ) was measured by applying a tensile strength of 30 cN to a test piece prepared by cutting the separators of Examples 1 to 3 and the Comparative Examples 1 and 2 into a rectangular stripe shape having a longitude in the flow direction and a width of 5 mm, while a distance between chucks was 20 mm. Similarly, the tan δ in the longitudinal direction (TD tan δ) was measured by applying a tensile strength of 30 cN to a test piece prepared by cutting the separators into a rectangular stripe shape having a longitude in the width direction and a width of 5 mm, while a distance between chucks was 20 mm. The measurements were carried out while increasing the temperature from a room temperature at a temperature-elevating rate of 20° C./min, and the parameter X was calculated using the value of tan δ when the temperature reached 90° C.

<3-5. Increase of Internal Resistance>

The increase in internal resistance of the secondary batteries, prepared according to the aforementioned method, after a charging/discharging cycle was obtained as follows. The secondary batteries were subjected to four-cycles of charging/discharging where one cycle is performed with a current of 0.2 C in a voltage range from 4.2 V to 2.7 V at 55° C. (A current which discharges a regulated capacity at a one-hour rate discharge capacity is defined as 1 C. The same definition is applied below). After that, a voltage with an amplitude of 10 mV was applied to the secondary batteries at 25° C. using an LCR meter (chemical impedance meter model 3532-80 manufactured by HIOKI E.E. CORPORATION) to measure alternating-current impedances of the secondary batteries.

An equivalent series resistance ($R_{s1}$: Ω) at a frequency of 10 Hz and an equivalent series resistance ($R_{s2}$: Ω) at a reactance of 0 were read from the measurement results, and a resistance ($R_1$: Ω) corresponding to their difference was calculated according to the following equation:

$$R_1:(\Omega)=R_{s1}-R_{s2}$$

where $R_{s1}$ mainly indicates a total resistance including a resistance (liquid resistance) when a Li$^+$ ion permeates the separator, a conduction resistance in the positive and negative electrodes, and a resistance of an ion passing through an interface between the positive electrode and the electrolyte solution. Hence, $R_1$ shows a summation of the resistance in the positive and negative electrodes and the resistance of the ion passing through the interfaces between the positive and negative electrodes and the electrolyte solution.

After measuring the resistance $R_1$, the secondary batteries were subjected to the charging/discharging cycle test for 100 cycles where a constant current in a voltage range from 4.2 V to 2.7 V was applied at 55° C. with one cycle set at a charging current of 10 and a discharging current of 100. After that, a voltage with an amplitude of 10 mV was applied to the secondary batteries at 25° C. using an LCR meter (chemical impedance meter model 3532-80 manufactured by HIOKI E.E. CORPORATION) to measure the alternating-current impedances of the secondary batteries.

Similar to the calculation of the resistance $R_1$, an equivalent series resistance ($R_{s3}$: Ω) at a frequency of 10 Hz and an equivalent series resistance ($R_{s4}$: Ω) at a reactance of 0 were read from the measurement results, and a resistance ($R_2$: Ω) indicating a summation of the conduction resistance in the positive and negative electrodes and the resistance of the ion passing through the interfaces between the positive and negative electrodes and the electrolyte solution after the 100 cycles was calculated according to the following equation.

$$R_2:(\Omega)=R_{s3}-R_{s4}$$

Next, the increase in internal resistance after the charging/discharging cycles was calculated according to the following equation.

Increase in internal resistance after the charging/discharging cycles [Ω]=$R_2-R_1$ 3-6. Initial Battery Resistance Alternating current with a 10 mV of voltage amplitude was applied to the secondary batteries fabricated by the aforementioned method at 25° C. using an LCR meter (chemical impedance meter model 3532-80 manufactured by HIOKI E.E. CORPORATION) to measure alternating-current impedances. An equivalent series resistance (Ω) at a frequency of 10 Hz was read from the measurement results and was employed as the initial battery resistance of the nonaqueous secondary battery.

3-6. Ability to Maintain Battery Performance

After that, the secondary batteries were subjected to charging/discharging for 100 cycles where a constant current in a voltage range from 4.2 V to 2.7 V was applied at 55° C. with one cycle set at a charging current of 1 C and a discharging current of 10 C. The nonaqueous electrolyte-solution secondary batteries subjected to the charging/discharging for 100 cycles were further subjected to charging/discharging at 55° C. for 3 cycles at a constant current until a charging current of 1 C and discharging currents of 0.2 C and 20 C. A ratio of discharging capacities at the discharging currents of 0.2 C and 20 C (20 C discharging capacity/0.2 C discharging capacity) in the third cycle was calculated as a rate property after the charging/discharging for 100 cycles. The same tests were carried out on the two secondary batteries fabricated by the aforementioned method, and an average of their rate properties after the charging/discharging for 100 cycles was obtained as the ability to maintain battery performance.

3-7. WI

The WIs of the separators were measured with a SCI (Specular Component Include (including regular reflection light)) method using a spectrophotometer (CM-2002 manufactured by Minolta Co., LTD) in a state where the separator was arranged over a black paper (a thickest black-colored grain long fine paper with a size of 788 mm×1091 mm). An average of the measured values obtained at three or more positions was employed as a result.

4. Discussion

The properties of the separators of the Examples 1 to 3 and the Comparative Examples 1 and 2 as well as those of the secondary batteries fabricated using the separators are summarized in Table 1. As shown in Table 1, the light-duty bulk densities of the polyolefin-resin composites serving as raw materials of the separators of the Examples 1 to 3 are as high as 500 g/L. This is probably because calcium carbonate was added after the ultrahigh-molecular weight polyethylene powder, the polyethylene wax, and the antioxidants were uniformly mixed and then mixing was carried out again so that the ultrahigh-molecular weight polyethylene, calcium carbonate, the polyethylene wax, and the antioxidants were uniformly mixed. On the other hand, in the Comparative Example 1, the light-duty bulk density of the polyolefin-resin composite is as low as 350 g/L, which suggests that a uniform mixing was not achieved. It is considered that the polyethylene crystals isotropically grow on a microlevel by stretching the sheet prepared with the uniformly mixed polyolefin-resin composite, followed by annealing. Hence, it can be understood that the parameters X of the separators of the Examples 1 to 3 indicative of the anisotropy of the tan δ are as small as 20 or less.

TABLE 1

Properties of the separators and secondary batteries

| | Light-duty bulk density (g/L) | Stretching rate (times) | Annealing temperature (° C.) | Parameter X | WI | Increase in resistance $R_2-R_1$ (Ω) | Maintenance rate of battery performance (%) |
|---|---|---|---|---|---|---|---|
| Example 1 | 500 | 6.2 | 126 | 7 | 86.84 | 0.69 | 63 |
| Example 2 | 500 | 7.0 | 123 | 2 | 91.48 | 0.74 | 71 |
| Example 3 | 500 | 6.2 | 120 | 16 | 94.01 | 0.86 | 68 |
| Comparative Example 1 | 350 | 4.0 | 120 | 26 | 96.59 | 2.09 | 37 |
| Comparative Example 2 | — | — | — | 72 | 83.72 | 1.50 | 44 |

The WIs of the separators of the Examples 1 to 3 are equal to or more than 85 and equal to or less than 98. As described above, in the case where the WI is equal to or more than 85 and equal to or less than 98, the amount of surface functional groups is suitable, and an optimal ion-permeability can be realized. The polyolefin-resin composites of the Examples 1 to 3 are uniformly mixed, which contributes to the uniform formation of a great number of pores.

On the other hand, in the Comparative Example 1 in which the uniform mixing was not realized, the polyethylene crystals after annealing are nonuniform on a microlevel, and the parameter X indicative of the anisotropy of the tan δ exceeds 20. In addition, the parameter X of the commercially available separator of the Comparative Example 2 also exceeds 20, and the WI is low. This is probably because the mixing of the polyethylene-resin composites of the Comparative Examples is nonuniform and the polyethylene crystals do not possess sufficient uniformity on a microlevel, inhibiting the formation of a great number of pores or uniform distribution of the pores.

As demonstrated in Table 1, the parameters X are equal to or less than 20, and the WIs are equal to or more than 85 and equal to or less than 98 for the separators of the Examples 1 to 3. The secondary batteries using these separators exhibit a small increase in internal resistance and a high battery-performance maintenance rate (rate property). When the anisotropy of the tan δ is small, the separator uniformly deforms according to the expansion and shrinking of the electrodes during the charging/discharging test, and the anisotropy of the stress generated in the separator is small. Therefore, separation of the electrode active substance and the like hardly occurs, which is considered to result in a reduction in the increase in internal resistance. Moreover, when the WI is high, the amount of polar functional groups such as a carboxyl group at the surface and in the separator is suitable with respect to the ion permeability, thereby providing a high rate-maintenance property of the secondary battery.

From the aforementioned results, it was confirmed that the formation and use of the separator having the parameter X and WI satisfying the ranges described in the First Embodiment allows the formation of a secondary battery having a suppressed increase in internal resistance and a high rate-maintenance property.

The aforementioned modes described as the embodiments of the present invention can be implemented by appropriately combining with each other as long as no contradiction is caused. Furthermore, any mode which is realized by persons ordinarily skilled in the art through the appropriate addition, deletion, or design change of elements is included in the scope of the present invention as long as it possesses the concept of the present invention.

It is understood that another effect different from that provided by the modes of the aforementioned embodiments is achieved by the present invention if the effect is obvious from the description in the specification or readily conceived by persons ordinarily skilled in the art.

EXPLANATION OF REFERENCE NUMERAL

100: Secondary battery, 110: Positive electrode, 112: Positive-electrode current collector, 114: Positive-electrode active-substance layer, 120: Negative electrode, 122: Negative-electrode current collector, 124: Negative-electrode active-substance layer, 130: Separator, 132: First layer, 134: Porous layer, 140: Electrolyte solution

The invention claimed is:

1. A separator comprising:
a first layer consisting of a porous polyolefin, having a parameter X equal to or more than 0 and equal to or less than 20 and a white index equal to or more than 85 and equal to or less than 98,
wherein the parameter X is defined by the following equation:

$$X = 100 \frac{|MD\tan\delta - TD\tan\delta|}{\frac{|MD\tan\delta + TD\tan\delta|}{2}}$$

where MD tan δ and TD tan δ are respectively a loss tangent in a flow direction and a loss tangent in a width direction which are obtained by a viscoelasticity measurement of the first layer at a temperature of 90° C. and a frequency of 10 Hz.

2. The separator according to claim 1, wherein the parameter X is equal to or more than 2 and equal to or less than 20.

3. The separator according to claim 1, wherein the white index is equal to or more than 85 and equal to or less than 95.

4. The separator according to claim 1, further comprising a porous layer over the first layer.

5. The separator according to claim 1, further comprising a pair of porous layers sandwiching the first layer.

6. A secondary battery comprising the separator according to claim 1.

* * * * *